United States Patent
Fan et al.

(10) Patent No.: US 7,519,521 B2
(45) Date of Patent: Apr. 14, 2009

(54) POPULATION ANALYSIS USING LINEAR DISPLAYS

(75) Inventors: David P. Fan, St. Paul, MN (US); Regis S. Fan, Westminster, CO (US)

(73) Assignee: InfoTrend, Inc., St. Paul, MN (US)

( * ) Notice: Subject to any disclaimer, the term of this patent is extended or adjusted under 35 U.S.C. 154(b) by 9 days.

(21) Appl. No.: 11/275,947

(22) Filed: Feb. 6, 2006

(65) Prior Publication Data

US 2006/0224548 A1    Oct. 5, 2006

Related U.S. Application Data (63) Continuation of application No. PCT/US2004/025455, filed on Aug. 6, 2004.

(60) Provisional application No. 60/492,788, filed on Aug. 6, 2003.

(51) Int. Cl.
  *G06F 17/50*    (2006.01)
  *G06F 7/00*    (2006.01)

(52) U.S. Cl. .................. 703/2; 707/2; 707/6; 707/100; 707/E17.093

(58) Field of Classification Search ............ 707/6, 707/7, 103, 5, 2, 100, E17.093; 703/2
See application file for complete search history.

(56) References Cited

U.S. PATENT DOCUMENTS

| | | | |
|---|---|---|---|
| 5,812,134 | A | 9/1998 | Pooser et al. |
| 6,594,673 | B1 | 7/2003 | Smith et al. |
| 6,928,436 | B2 * | 8/2005 | Baudel ............ 707/6 |
| 7,181,438 | B1 * | 2/2007 | Szabo ............ 707/2 |
| 2002/0161736 | A1 | 10/2002 | Beygelzimer et al. |
| 2004/0024532 | A1 | 2/2004 | Kincaid |
| 2004/0027350 | A1 | 2/2004 | Kincaid et al. |
| 2006/0288023 | A1 * | 12/2006 | Szabo ............ 707/100 |

FOREIGN PATENT DOCUMENTS

WO    WO-2005015354 A2    2/2005
WO    WO-2005015354 A3    2/2005

* cited by examiner

*Primary Examiner*—Thai Phan
(74) *Attorney, Agent, or Firm*—Schwegman, Lundberg & Woessner, P.A.

(57) ABSTRACT

The invention described herein includes a method of analyzing a population of individuals. The method includes entering the population of individuals into an information processing system. Each individual includes one or more properties. Each property includes one or more conditions and a numerical value. The method also includes displaying the population of the individuals in a visual map. The visual map is divided into parallel property zones of properties. The individuals are represented in the map as parallel lines wherein the lines are orthogonal to the property zones.

27 Claims, 9 Drawing Sheets

POPULATION ANALYSIS USING LINEAR DISPLAYS

RELATED APPLICATION

This application is a continuation under 35 U.S.C. 111 (a) of PCT/US2004/025455, filed Aug. 6, 2004, and published in English on Feb. 17, 2005 as WO 2005/015354 A2, which claims benefit under 35 U.S.C. 119 (e) of U.S. Provisional Application Ser. No. 60/492,788 filed Aug. 6, 2003, which applications and publication are incorporated herein by reference.

FIELD OF THE INVENTION

The technical field relates generally to the field of data modeling and analysis more specifically, to systems, methods, displays, and structures for analyzing populations of individuals wherein each individual possesses a set of properties.

COPYRIGHT NOTICE-PERMISSION

A portion of the disclosure of this patent document contains material which is subject to copyright protection. The copyright owners have no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings attached hereto: Copyright © 2004, David P. Fan and Regis S. Fan, All Rights Reserved.

BACKGROUND

Consider a population consisting of individuals with each individual having a set of properties with each property being associated with a numerical value. One current method for visually displaying information about interesting properties of individual's uses a table with the individuals displayed on one axis and the properties of the individuals displayed on an orthogonal axis. One current method for displaying information in the table includes using text to display the numerical values and the labels for both axes.

SUMMARY

The invention described herein includes a method of analyzing a population of individuals. The method includes entering the population of individuals into an information processing system. Each individual includes one or more properties. Each property includes one or more conditions and a numerical value. The method also includes displaying the population of the individuals in a visual map. The visual map is divided into parallel property zones of properties. The individuals are represented in the map as parallel lines wherein the lines are orthogonal to the property zones.

The invention also includes another method of analyzing a population of individuals that includes collecting data on individuals in a population wherein each individual possesses one or more properties wherein each property includes one or more conditions of a value and a name. The method also includes specifying properties that each individual must have; specifying an ordered linear sequence for the properties; specifying an ordered linear sequence for the individuals; and displaying the individuals in a visual map.

The invention further includes a machine readable medium, with instructions thereon, the instructions, when executed, operable to generate a map display on a computer, the map display being divided into parallel property zones representing properties; and parallel lines wherein the parallel lines are orthogonal to the property zones.

The invention also includes a system for analyzing a population of individuals. The system includes a monitor capable of electronically displaying a map, the map display being divided into parallel property zones representing properties and parallel lines wherein the parallel lines are orthogonal to the property zones. The system also includes machine readable medium, with instructions thereon. The instructions, when executed, are operable to generate the map display on the monitor.

DETAILED DESCRIPTION

In the following detailed description of exemplary embodiments of the invention, reference is made to the accompanying drawings which form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the invention discussed herein. The following detailed description is, therefore, not to be taken in a limiting sense, and the scope of the invention discussed herein is defined only by the appended claims.

The embodiments of the invention discussed herein are directed to a system for population analysis wherein the population includes individuals with each individual possessing a set of properties.

In one embodiment, the term, "individual" as used herein, refers to a person.

In another embodiment, the term "individual" as used herein refers to a product. In one embodiment, the product is a task or service. In another embodiment, the product is a commercial product. The commercial product may be a product offered for sale through e-commerce or the commercial product may be a product offered for sale through an Internet web page. In one embodiment, the product includes the specifications of a product.

In another embodiment, the term "individual" as used herein refers to a document. In one embodiment, the document includes text. For some embodiments, the document is a legal document such as a government document, a patent, a trademark, or a court case. In one other embodiment, the document is identified using an electronic database search engine. In another embodiment, the document is an Internet web page.

In another embodiment, the individual is a portion of a document. In one embodiment, the individual is a patent claim.

A property, as used herein, includes a numerical value, one or more conditions for specifying the numerical value, and a name.

For embodiments where the individual is a person, properties of the person include a height, an age, a sex, an interest, a skill, an education, one or more medical conditions, or another aspect of the person.

For embodiments where the individual is a commercial product, properties of the commercial property include cost, a style, a brand, a color or another aspect of the commercial product.

For embodiments where the individual is a document, properties of the document include ideas, a length, a date, an author, a title, or another aspect of the document.

For embodiments where individuals are representations of individuals and not the individuals themselves, properties are representations of properties and not the properties themselves. A system of population analysis includes a method for presenting information from tables in a form that is both compact and clear.

Figure 1:
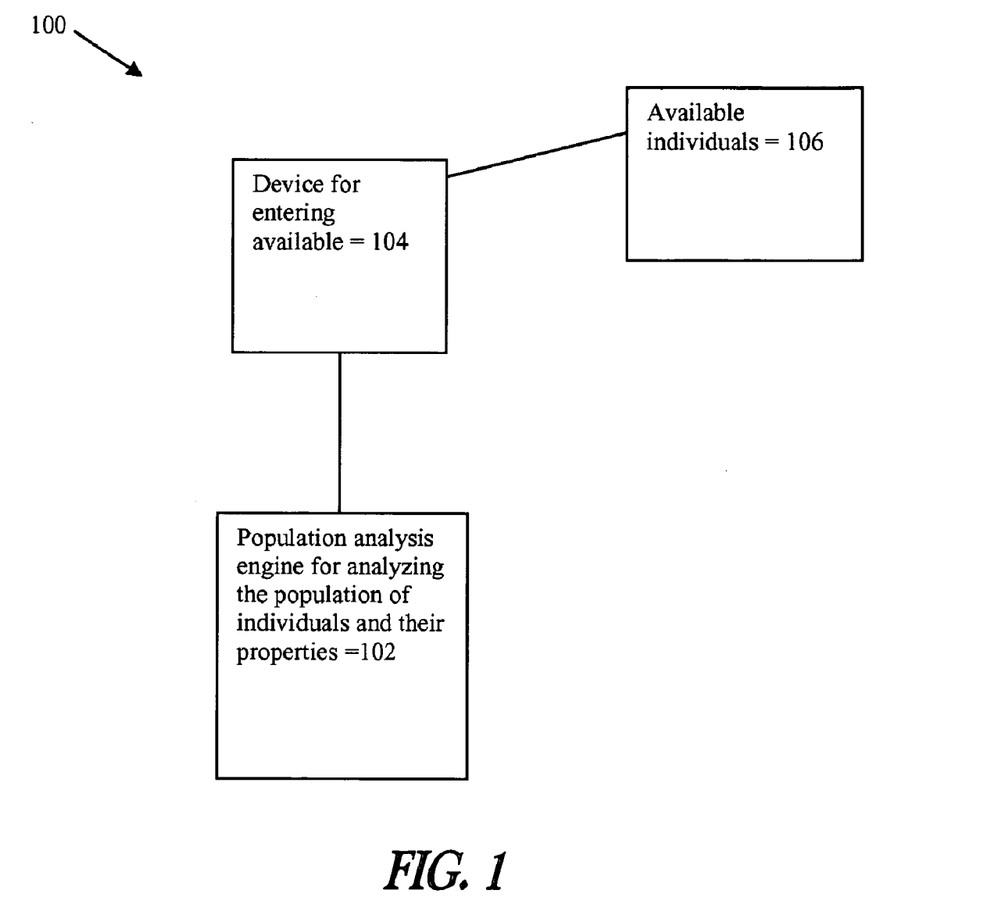
FIG. 1 is a block diagram of a system according to one aspect of the invention discussed herein.

FIG. 1 is a block diagram of a system, illustrated at 100, according to one aspect of the invention discussed herein. In some embodiments, the system 100 includes a population analysis engine 102. In some embodiments, the population analysis engine 102 includes software to analyze a population.

In some embodiments, the population analysis engine 102 is adapted to interface with a device 104 for entering available individuals 106. In various embodiments, device 104 includes a keyboard, a computer mouse, a connection to remote data sources, software operating on the device 104 for extracting data or information about an individual such as optical character recognition software or software for extracting properties from text, and other devices and software that are capable of receiving or extracting data for input into the population analysis engine 102. While specific devices 104 have been described, it is understood that other devices are suitable for use in the invention described herein.

In an exemplary embodiment provided for illustrative purposes, not intended to limit the invention described herein, the system 100 is instantiated by creating an instance called "example 1" wherein all individuals are patent documents.

Figure 2:
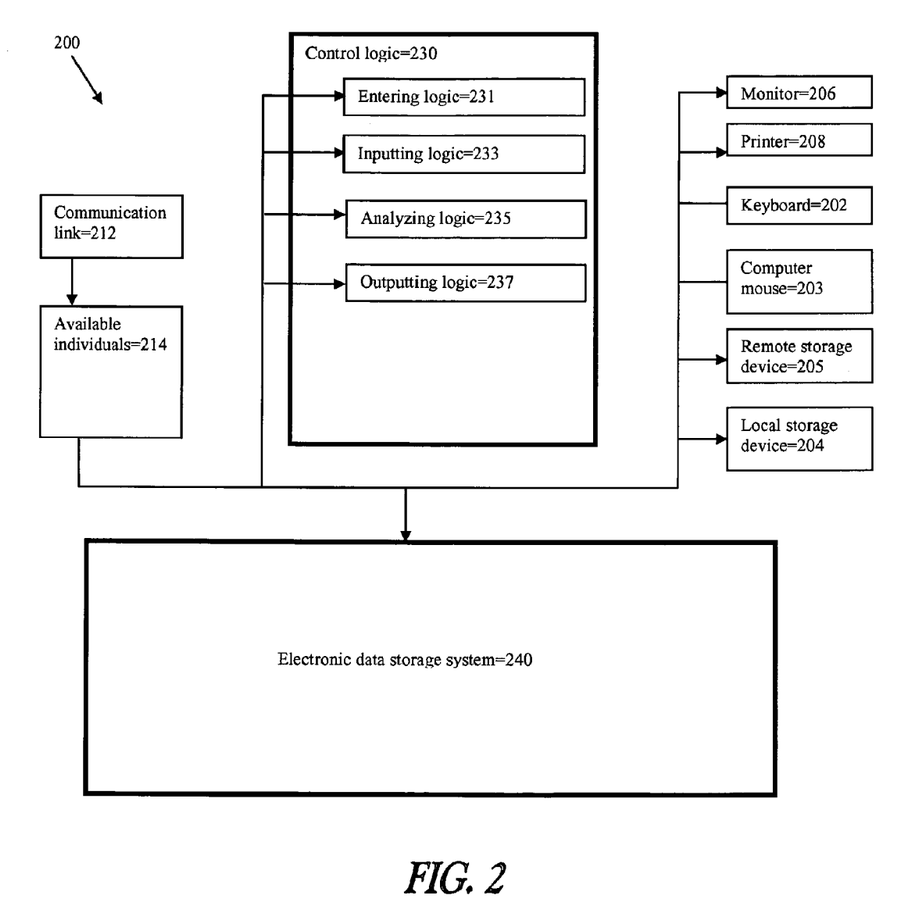
FIG. 2 is a structure diagram of a structure according to one aspect of the invention discussed herein.

FIG. 2 illustrates a block diagram of one embodiment of system 100, shown in greater detail and is referred to herein as system 200. In some embodiments, system 200 is designed to use available individuals for constructing a population 214. In one embodiment, individuals of the population 214 are accessed through communication link 212 to access a local storage device 204, a remote storage device 205, a keyboard 202, and a computer mouse 203. In some embodiments, system 200 includes an electronic storage system 240. In some embodiments, the system 200 includes a controller 230 that includes control logic to control a population analysis process. In one embodiment, control logic of the controller 230 includes one or more logic-based tasks including entering logic 231 for controlling the task of entering individuals and properties into the electronic data storage system 240, inputting logic 233 for controlling the task of inputting user specified conditions for population analysis, analyzing logic 235 for controlling the population analysis, and outputting logic 237 for controlling the output of the population analysis.

Figure 3:
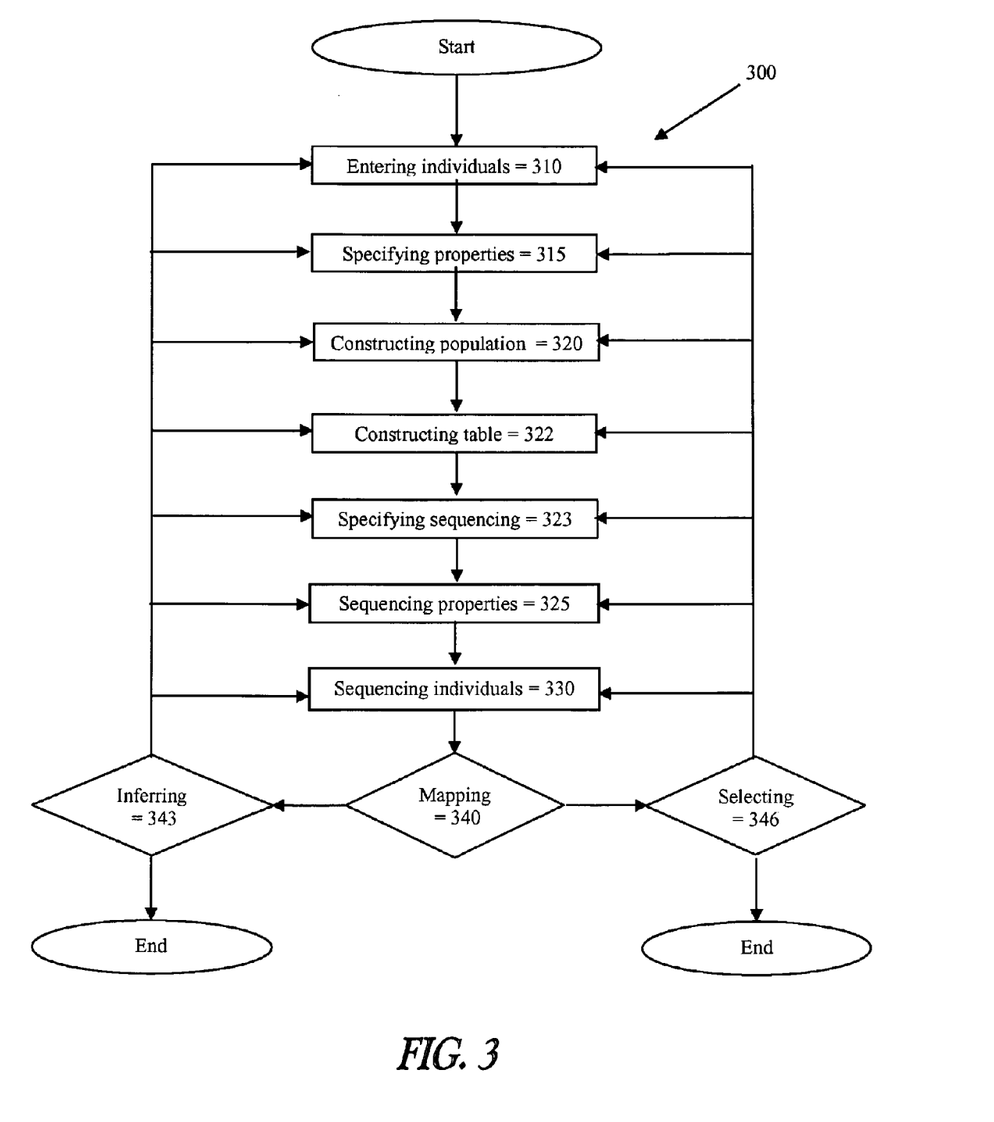
FIG. 3 is a process diagram of a method according to one aspect of the invention discussed herein.

FIG. 3 illustrates a process diagram of a process embodiment 300 for population analysis. In some embodiments, the process 300 includes a step of entering individuals 310 for entering available individuals into an electronic data storage system. For example 1, a user performs the step of entering individuals 310 using specified conditions to pass electronic commands through a communication link to an electronic database to enter available patent documents in electronic data storage system 240. In some embodiments, process 300 includes specifying properties 315 for specifying one or more conditions, the numerical value, and the name of a property.

For example 1, specifying properties 315 includes specifying a property which is an idea of interest to the user. In one embodiment, specifying properties 315 specifies the condition that the idea should be inferred from the presence of one or more keywords in a document. In one embodiment, specifying properties 315 includes specifying a method for arriving at a numerical value for the idea. In one embodiment, specifying properties 315 includes assigning a name for the idea.

In example 1, specifying properties 315 specifies a property with name IdeaCount. Specifying properties 315, generally, specifies a condition that the numerical value of the property should be the count of all user specified ideas in the document. In another embodiment of example 1, specifying properties 315 includes specifying another property such as the length, the author, the country of origin or another aspect of the document, such as a patent document.

In some embodiments, process 300 includes selecting population 320 for constructing a population from available individuals entered by entering individuals 310. In one embodiment, selecting population 320 includes constructing the population using all individuals entered by entering individuals 310. In another embodiment, selecting population 320 includes constructing the population by including individuals with a specified numerical value for each of one or more properties. In one embodiment, selecting population 320 includes constructing the population from individuals selected at random.

In one embodiment of example 1, selecting population 320 includes constructing the population from documents containing at least one idea within a subset of ideas specified by the user.

In some embodiments, process 300 includes constructing table 322 to construct a table containing the numerical values of user specified properties for individuals of the population. In one embodiment, constructing table 322 constructs the table with individuals represented in the columns and with properties of the individuals represented in the rows. The process 300 also includes specifying sequencing 323. The step of specifying sequencing specifies conditions for constructing an ordered sequence of properties and an ordered sequence of individuals.

In some embodiments, process 300 includes sequencing properties 325 to construct an ordered sequence of properties according to specified conditions. In one embodiment, sequencing properties 325 orders the properties independently of the ordering of the individuals.

In one embodiment of example 1, sequencing properties 325 uses user input to construct an ordered sequence of properties with the order of the sequence corresponding to the names, such as, in one example, _keyword, _parallel, _line, IdeaCount, _document, _linear, not_AudVid, and _text.

In some embodiments, process 300 includes sequencing individuals 330 to construct an ordered sequence of individuals according to specified conditions.

In one embodiment of example 1, a step 330 uses the ordered sequence of properties constructed by sequencing properties 325 as the hierarchy for the hierarchical sorting of individuals. Using the hierarchy specified by the ordered sequence of properties with names, for example, _keyword, _parallel, _line, IdeaCount, _document, _linear, _not_AudVid, and _text, sequencing properties 325 sorts the population such that all documents with the idea_keyword are in one part of the sequence of documents and such that all documents without the idea are in another part of the sequence of documents. Continuing to the property with next name in the hierarchy, the step 330 sorts among all documents with the first idea_keyword to place documents with the idea_parallel in one group and all documents without the idea_parallel in another group. The step 330 proceeds iteratively through all the properties in the hierarchy to sequence the documents.

In one embodiment, sequencing properties 325 orders the properties independently of the ordering of the rows.

In some embodiments, process 300 includes mapping 340 to construct a visual map of the population selected by the step 320. In one embodiment, mapping 340 constructs the visual map with properties displayed in a vertical sequence and individuals in a horizontal sequence.

In one embodiment of example 1, mapping 340 constructs a map with the properties of the document displayed in horizontal zones in a vertical sequence and with individual documents represented by vertical lines in a horizontal sequence. In one embodiment, a line representing a document is assigned a line state.

In some embodiments, process 300 includes a step of inferring 343 wherein the user examines the map visually to draw inferences about the population.

In some embodiments, process 300 includes selecting 346 wherein the user selects a line by double clicking the computer mouse pointing to the position of the line on the monitor. Selecting 346 assigns the line state of the line to the output state and outputs for the user extensive details about the individual in the output state. In one embodiment, the step of selecting 346 outputs the extensive details as one or more images on the monitor.

In one embodiment of example 1, selecting 346 outputs the entire patent document if the line for the document is in the output state.

Figure 4:
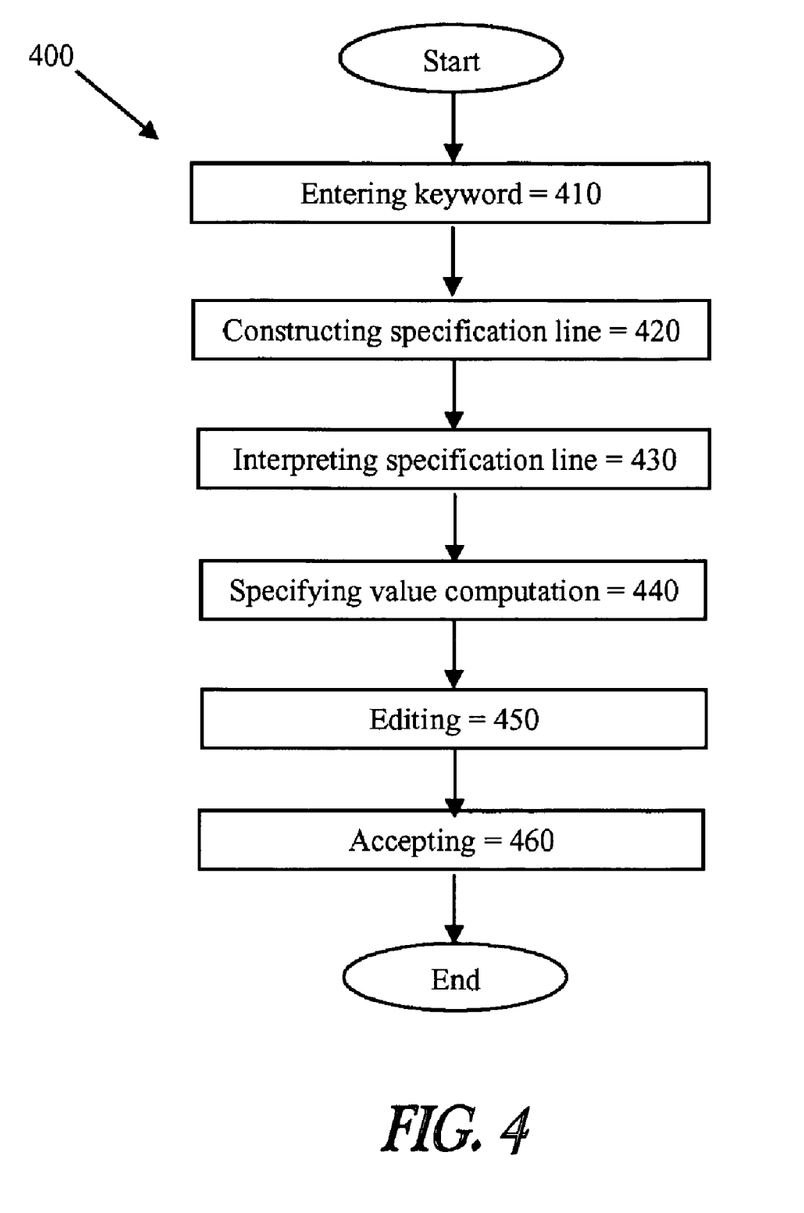
FIG. 4 is a process diagram of an example method according to one aspect of the invention discussed herein.
Figure 5:
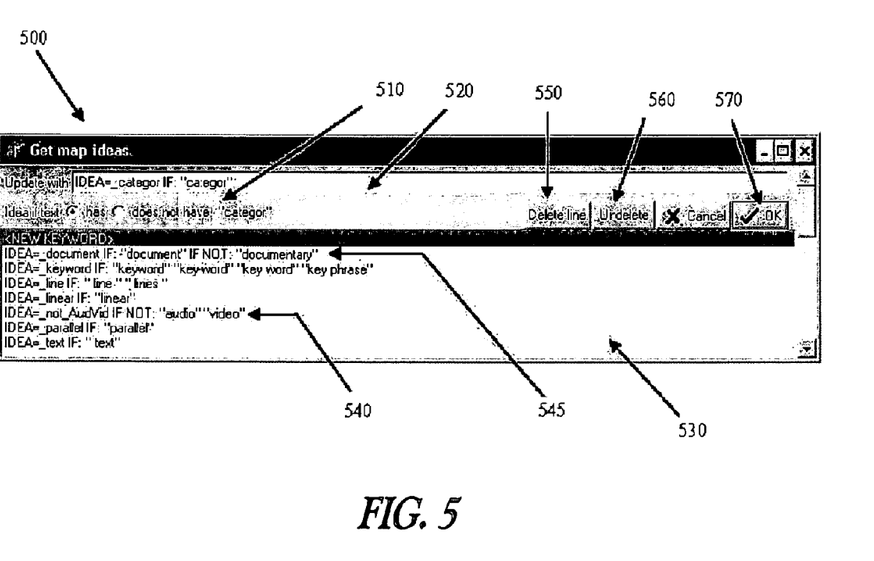
FIG. 5 is a display diagram of an example display according to one aspect of the invention discussed herein.

FIG. 4 illustrates a process embodiment 400 for specifying properties 315. FIG. 5 illustrates a display 500 according to an exemplary instance of example 1. The Display 500 is an image on the monitor produced according to the process 400.

In some embodiments, process 400 includes entering keyword 410 associated with an idea. In one embodiment, entering keyword 410 specifies a string of characters entered by the user using the keyboard. In another embodiment, entering keyword 410 includes specifying a string of characters selected by the user using the computer mouse. In one embodiment, entering keyword 410 includes displaying a keyword inside quotation marks.

For display 500, entering keyword 410 includes displaying an entered keyword "categor" in quotation marks on radio button line 510.

In some embodiments, process 400 includes constructing specification line 420 for constructing a specification line of text to associate at least one keyword with an idea. Constructing specification line 420 uses the same form to construct one or more specification lines as displayed in edit box 520 and in text box 530.

For display 500, constructing specification line 420 includes scanning for the selected radio button on radio button line 510. If the radio button is associated with the phrase "has," constructing specification line 420 includes displaying the keyword in quotation marks to the right of the string "IF:" in the specification line of text in edit box 520 without an intervening string "IF NOT:". An example is the specification line in edit box 520.

For display 500, if the radio button on radio button line 510 is associated with the phrase "does not have," constructing specification line 420 includes displaying the keyword in quotation marks to the right of the reserved string "IF NOT:" in a specification line. An example is specification line 540 in text box 530. In one embodiment, constructing specification line 420 displays the reserved string "IF NOT:" to the right of reserved string "IF:" if both reserved strings are in a specification line. An example is specification line 545 in text box 530.

In one embodiment, a specification line includes the idea to which a keyword belongs. In one embodiment, constructing specification line 420 includes using input to specify a name for an idea. In one embodiment, constructing specification line includes converting an instance of a keyword to the name by adding an underscore "" to the beginning of the instance. An example is the specification line in edit box 520. In one embodiment, constructing specification line 420 includes converting an instance of a keyword to the name by adding "_not_" to the beginning of the instance if the specification line includes the reserved string "IF NOT:" but not the reserved string "IF:". An example is line 540 in text box 530. In one embodiment, constructing specification line 420 includes using an underscore to replace a user specified character in the idea name. In one embodiment, constructing specification line 420 assigns the name as the string of characters in a specification line between the reserved string "IDEA=" and a space character.

In one embodiment, constructing specification line 420 includes adding a keyword to a specification line selected by the user from text box 530 and placing the altered specification line in edit box 520 if the specification line in text box 530 does not include the reserved string "<NEW KEYWORD>".

In one embodiment, constructing specification line 420 includes replacing a selected specification line in text box 530 by the specification line in edit box 520.

In some embodiments, process 400 includes interpreting specification line 430 for interpreting a specification line constructed by constructing specification line 420.

In one embodiment, interpreting specification line 430 includes interpreting that the idea on a specification line is present if the document includes a keyword to the right of reserved string "IF:" and does not include a keyword to the right of reserved string "IF NOT:". In one embodiment, interpreting specification line 430 includes determining whether or not the idea on a specification line is present if the specification line does not include reserved string "IF:" and the document does include a keyword to the right of reserved string "IF NOT:".

In some embodiments, process 400 includes specifying value computation 440 for specifying a method for computing the numerical value of an idea.

In one embodiment, specifying value computation 440 assigns a numerical value for an idea to the binary value of 1 if the idea is present in a document and to the binary value of 0 if the idea is absent from a document. In another embodiment, specifying value computation 440 assigns the numerical value to the quantitative value corresponding to the number of instances of the idea in a document.

In some embodiments, process 400 includes editing 450 using user input to edit a specification line.

In one embodiment, editing 450 uses user input to modify the specification line in edit box 520. In one embodiment, editing 450 deletes a specification line from the text box 530 if the user clicks button 550 marked "Delete line." In one embodiment, editing 450 restores a deleted specification line to the text box if the user clicks button 560 marked "Undelete."

In some embodiments, process 400 includes accepting 460 to accept specified specification lines for use in the population analysis.

In one embodiment, accepting 460 accepts all specification lines in text box 530 for use in the population analysis if the user clicks button 570 marked "OK."

Figure 6:
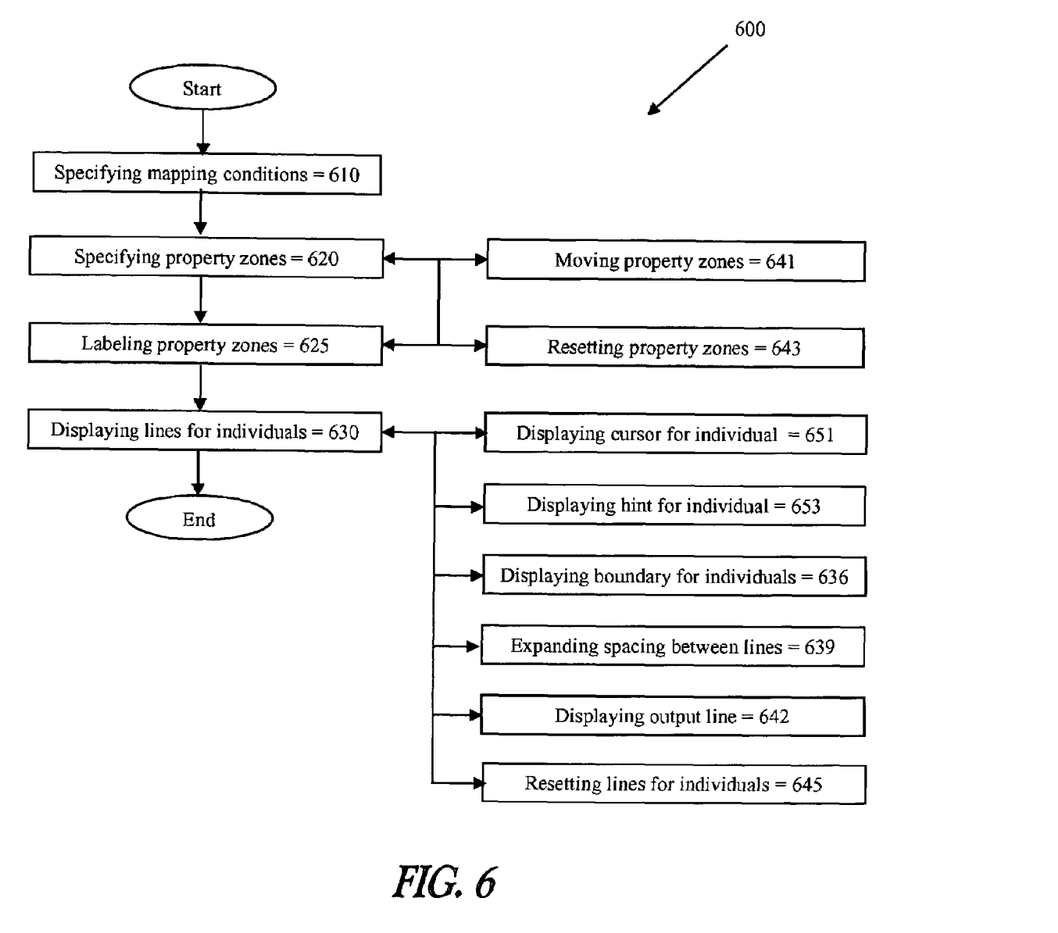
FIG. 6 is a process diagram of a method according to one aspect of the invention discussed herein.

FIG. 6 illustrates a process embodiment 600 of mapping 340 for constructing a map for a population. In one embodiment, the map is generated in example 1.

Figure 7:
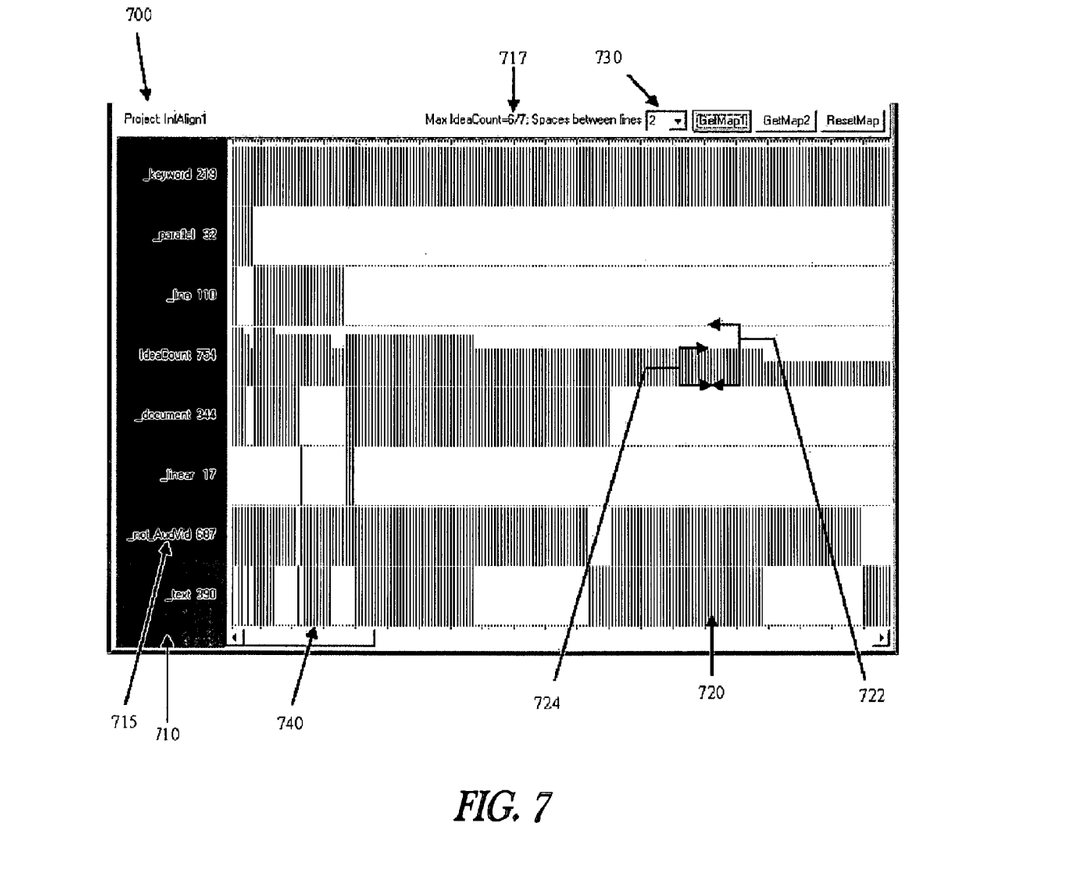
FIG. 7 is a display diagram of an example display according to one aspect of the invention discussed herein.

FIG. 7 illustrates a display embodiment 700 according to an instance of example 1 of the invention discussed herein. Display 700 is an exemplary image on the monitor generated using the process 600.

In some embodiments, process 600 includes specifying mapping conditions 610 to specify the conditions for constructing a map of the population. In one embodiment, specifying mapping conditions 610 includes specifying the line spacing between lines representing individuals on the map. In one embodiment, specifying mapping conditions 610 specifies a default spacing. In one embodiment, specifying mapping conditions 610 specifies an expanded spacing. In one embodiment, specifying mapping conditions 610 specifies a map background color.

In one embodiment, specifying mapping conditions 610 specifies a line background color. In one embodiment, specifying mapping conditions 610 specifies that a line background color is a default line color. In one embodiment, specifying mapping conditions 610 specifies that a line background color is a cursor line color.

In one embodiment, specifying mapping conditions 610 specifies that a line background color is an output line color.

In one embodiment, specifying mapping conditions 610 specifies a presence of color.

In one embodiment, specifying mapping conditions 610 specifies a default line width for individuals.

In one embodiment, specifying mapping conditions 610 specifies a default line style for individuals.

In one embodiment, specifying mapping conditions 610 specifies a boundary style.

In one embodiment, specifying mapping conditions 610 specifies a calculation method for calculating a transformed value of a numerical value of a property. In one embodiment, a transformed value increases monotonically with the value before transformation.

In one embodiment, a calculation method includes weighting, logarithmic transform, or another mathematical method.

In one embodiment, the calculation method assigns a minimum value such that all values below the minimum value are assigned to the minimum value.

In one embodiment, the calculation method assigns a maximum value such that all values above the maximum value are assigned to the maximum value.

In the one embodiment, the calculation method assigns a category value such that all values between a pair of specified limit values are transformed to the same category value.

In one embodiment, a statistical method transforms a value to a standard deviation based value. V is the value of a property of an individual. M is a mean value of the property for all individuals in the population. S is a standard deviation for the values of the property for all individuals in the population. The standard deviation based value is a $(2+(V-M)/S)/4$ with all values below 0 assigned to 0 and all values above 1 assigned to 1.

In some embodiments, process 600 includes specifying property zones 620 to specify the zones on the map corresponding to specific properties.

For display 700, specifying property zones 620 specifies that a property zone is a rectangle extending the width of the map with a property zone for one property being parallel to the property zone of another property.

In some embodiments, process 600 includes labeling property zones 625 to display a label in a property zone.

For display 700, labeling property zones 625 includes displaying a label 715 in a rectangle 710 of uniform width at the left side of the map. Labeling property zones 625 includes displaying the label 715 within the property zone of the property corresponding to the label and includes the name of the property and the count of individuals with numerical values greater than zero for the corresponding property. In another embodiment, specifying property zones 620 includes labeling with other information. In another embodiment, specifying property zones 620 includes displaying no labels.

The step of labeling property zones 625 displays text line 717 to indicate that the highest value of IdeaCount is 6 for any individual in the population and that the total number of ideas in the map is 7.

In some embodiments, process 600 includes displaying lines for individuals 630, one of which is shown at 701 in FIG. 7. The lines are parallel and are orthogonal to the direction of the sequence of the property zones.

A step of displaying lines for individuals 630 in process 600 represents an individual as a vertical line 720 with the line divided into line segments with each line segment corresponding to a property of the individual. The step of displaying lines for individuals 630 assigns the style of the line to the default line style of a solid line as specified by specifying mapping conditions 610. Line segment 722 of the line 720 corresponds to the property IdeaCount and extends the height of the rectangular property zone for IdeaCount. In one embodiment, the line segment 722 includes a line sub-segment 724 with the length indicating a value of the property. The step of displaying lines for individuals 630 displays the line sub-segment in the presence color of blue as specified by specifying mapping conditions 610. Displaying lines for individuals 630 in process 600 positions the line sub-segment at the bottom of the property zone in display 700. In another embodiment, the step of displaying lines for individuals 630 in process 600 centers the line sub-segment vertically within the property zone in display 700.

In one embodiment for a property with binary values, displaying lines for individuals 630 specifies that the length of the line sub-segment in the presence color should be the entire length of the line segment if the value of the corresponding property for the individual is 1, when shown in the display 700. In one embodiment, displaying lines for individuals 630 specifies that the length of the line sub-segment in the presence color should be 0 if the value of the property is 0 for the individual, when shown in the display 700.

In one embodiment, displaying lines for individuals 630 specifies that the length of the line segment shown in display 700 should be based on the standard deviation based value.

Displaying lines for individuals 630 uses the presence color in display 700 to display the line sub-segment for the property IdeaCount with the length of the line sub-segment assigned to be the standard deviation based value of the property times the length of the line segment.

Displaying lines for individuals 630 assigns the line state of a line in display 700 to the default state. Displaying lines for individuals 630 specifies that the line background color of a line in display 700, in the default state is the default line color of white as specified by specifying mapping conditions 610. Displaying lines for individuals 630 uses the line background color to display all portions of a line for an individual not in the presence color in display 700.

In one embodiment, displaying lines for individuals 630 displays a short line in the presence color at the bottom of a line segment in display 700. In one embodiment, displaying lines for individuals 630 displays a short line in a line background color at the top of a line segment in display 700.

In one embodiment, displaying lines for individuals 630 displays all individuals in the population as parallel vertical lines with a default line width with a default line spacing in display 700. Displaying lines for individuals 630 displays a line in display 700 using the default line style of a solid line, the default line width of one pixel, and the default spacing of 2 pixels as specified by specifying mapping conditions 610. Specifying mapping conditions 610 displays the value of 2 for the default spacing in edit box 730. A portion of the map extends beyond the right hand side of the display. Displaying lines for individuals 630 uses user input in the form of a horizontal movement of scroll bar 740 to display lines that are off the display 700.

For display 700, displaying lines for individuals 630 places short vertical tic marks at the top and bottom edges of the map in the black color at the positions of the lines representing individuals with the tic marks being longer at periodic intervals.

Displaying lines for individuals 630 uses the map background color of display 700 to display all parts of the map not occupied by the property labels, the lines representing the individuals, and the tic marks. Displaying lines for individuals 630 uses the map background color of white in display 700 as specified by specifying mapping conditions 610.

Figure 8:
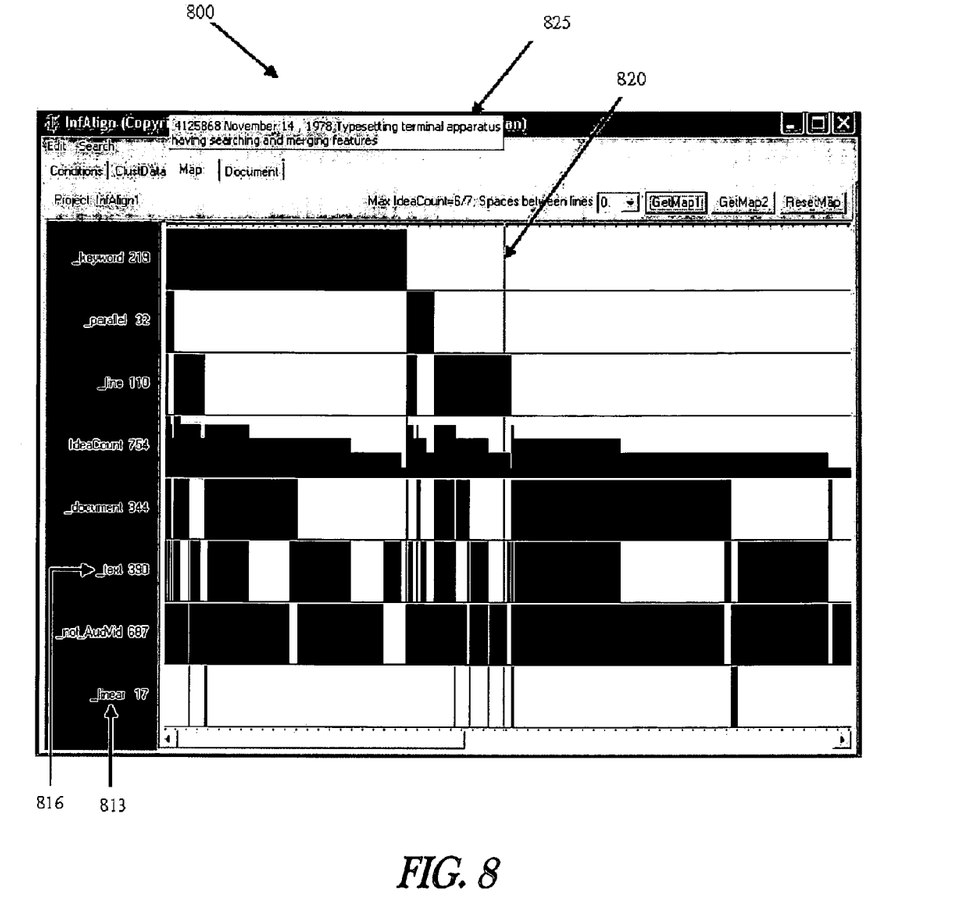
FIG. 8 is a display diagram of an example display according to one aspect of the invention discussed herein.

Display 800 in FIG. 8 is generated on a computer monitor by the process 600. The individuals and properties for display 800 are the same as individuals and properties of display 700.

In some embodiments, process 600 includes a step of moving property zones 641. In one embodiment, the step of moving property zones 641 includes using user input in the form of a drag of the computer mouse from one property label to another property label. Moving property zones 641 exchanges the positions of two property labels and their corresponding property zones.

Display 800 displays the results of the exchange of the two properties 813 and 816. The two properties have the reverse order as compared to display 700. The step of displaying lines for individuals 630, includes displaying the lines according to display 800 with no spaces in between after specifying mapping conditions 610 specifies a default spacing of 0 pixels.

In some embodiments, process 600 includes resetting property zones to restore the property zones to the zones in the initial instance of the map.

In some embodiments, process 600 includes a step of displaying a cursor for individual 651. For display 800, the computer mouse is located over a line 820 corresponding to an individual. Displaying a cursor for an individual 651 assigns the line state of the line to the cursor state. Displaying a cursor for an individual 651 assigns the line background color of a line with the line state in the cursor state to be the cursor line color of green as specified by specifying mapping conditions 610. Displaying a cursor for an individual 651 includes using the line background color to display all portions of the line not in the presence color. Displaying a cursor for the individual 651 displays the tic marks for the line in the background line color if the line state of the line is not in the default state.

In some embodiments, process 600 includes displaying a hint for individual 653. When the computer mouse hovers over a line corresponding to an individual, displaying the hint for individual 653 displays a hint box with information about the individual. For display 800, displaying the hint for individual 653 places the night edge of a hint box 825 at the cursor position in the horizontal dimension and the top of the hint box toward the top of the map. In one embodiment, displaying the hint for individual 653 places the left or right edge of the hint box as close as possible to the cursor position using the condition that the entire hint box should be displayed on the display 800. Displaying the hint for individual 653 places information about the individual in the hint box. In one embodiment, the hint box provides information about the individual independent of the property over which the mouse hovers. For display 800, the hint box provides the number, the date, and the title of the patent document corresponding to the line over which the cursor hovers. For display 800, none of the information in the hint box is on the map. In another embodiment, the hint box provides information specific to the property over which the mouse hovers. In one example, the hint box includes text including the numerical value of the IdeaCount if the cursor hovers over the property IdeaCount. In another embodiment, the hint box provides non-text information, for example a geographical map including the country of origin of a patent.

Figure 9:
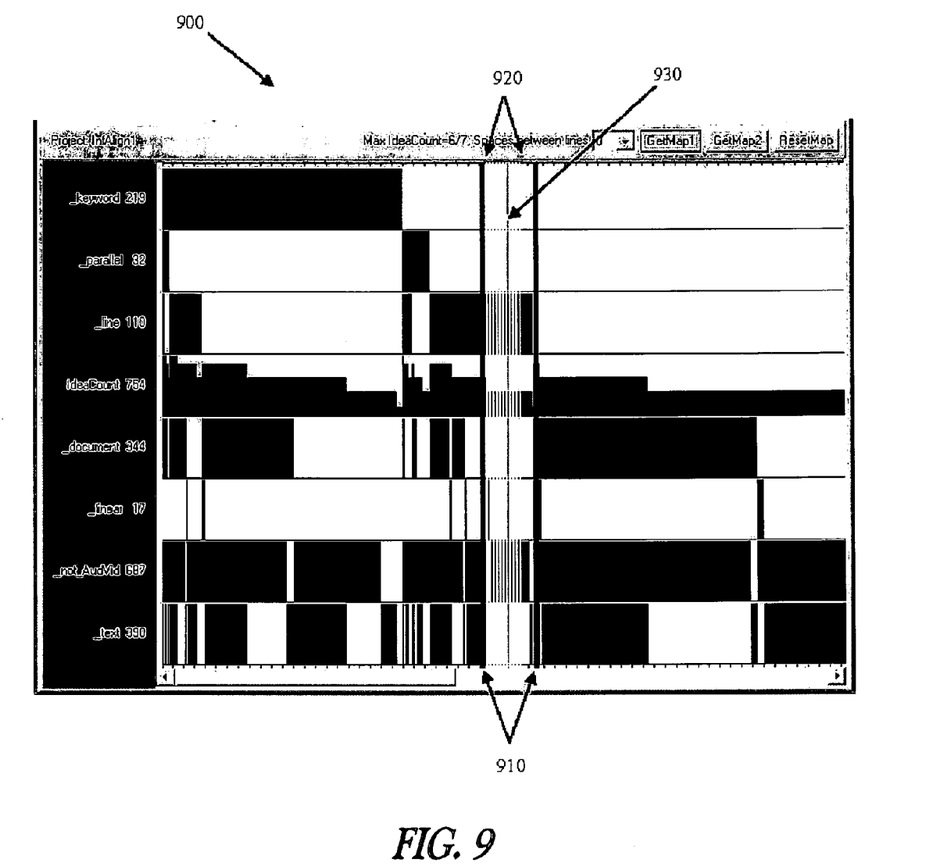
FIG. 9 is a display diagram of an example display according to one aspect of the invention discussed herein.

FIG. 9 illustrates a display diagram 900 according to an example of one aspect of the invention discussed herein. Display 900 displays an exemplary image on the monitor according to a process 600.

Returning to FIG. 6, in some embodiments, process 600 includes displaying a boundary for individuals 636. Displaying a boundary for individuals 636 places a vertical boundary on the map at the position at which the user right clicks a computer mouse. For display 900, displaying the boundary for individuals 636 displays two boundaries 910 using the specifications from specifying mapping conditions 610 that the boundary style should be a solid line with width 4 pixels in the black color.

In some embodiments, process 600 includes expanding spacing between lines 639. Expanding spacing between lines 639 includes user input in the form of a drag of the computer mouse over a region of the map containing lines corresponding to individuals to assign the region as a selected individual region. For display 900, expanding spacing between lines 639 changes the spacing between all lines within the selected individual region 920 to the expanded spacing of 3 pixels as specified by specifying mapping conditions 610.

As discussed hereinbefore, the step 346 in one embodiment assigns the line state of a line to the default state. In some embodiments, process 600 includes displaying output line 642. Displaying output line 642 displays a line in the output state using as line background color the output line color specified by specifying mapping conditions 610. For display 900, the line 930 in the output state is displayed using the output line color of aqua as the background color.

In some embodiments, process 600 includes resetting lines for individuals 645. For displays 700, 800, and 900, resetting lines for individuals 645 responds to user activation of button ResetMap to reset the map to the initial instance of the map.

Various modifications can be made to the embodiments already described without departing from the scope of the invention discussed herein. Some of these embodiments are described as follows:

Alternate embodiments for constructing ordered linear sequences.

In one embodiment, a single comparison value is a transformation of a value in the table wherein the single comparison value increase monotonically with the value before transformation. In one embodiment, a transformed value is a rank order of the individual within a row with all individuals at the same rank having the same single comparison value equivalent to the average of the ranks for the individuals at the same rank. In another embodiment, a transformed value is a standard deviation based value. In another embodiment, the transformed value is the value before transformation.

In one embodiment, a single comparison distance is the difference between the transformed values of two rows for the same column. In another embodiment, the single comparison distance is the absolute value of the single comparison distance.

In one embodiment, a total comparison distance quantifies the distance between two rows. The total comparison distance between a pair of rows is the sum of all single comparison distances for the pair of rows. In one embodiment, the computation of a total comparison distance does not include a single comparison distance if a single comparison value used to compute the single comparison distance is missing.

In one embodiment, sequencing properties 325 maximizes similarities among nearby rows. In one embodiment, the rows are arranged in a circular permutation of rows. The similarities are maximized by minimizing the sum of the total comparison distances between all rows in the circular permutation. In one embodiment, the minimization is performed using a solution to the Traveling Salesman Problem of computer science wherein the goal is to minimize the distance a salesman travels in making a circular tour visiting each city just once before returning to the starting point. In one embodiment sequencing properties 325, the rows replace the cities and the total comparison distances replace the distances between the cities in the solution of the Traveling Salesman Problem. After the minimization, the circular permutation is cut to produce the linear sequence of the table.

In another embodiment, sequencing properties 325 solves the Traveling Salesman Problem to maximize similarities rather than to minimize distances. In one embodiment, a similarity is a statistical correlation. In another embodiment, a similarity is a probability that two individuals have the same value for a property.

In another embodiment, a sequence of properties is computed including a method used for cluster analysis.

In one embodiment, the rows and columns in the table are interchanged to maximize similarities among individuals instead of the properties.

(A). Use of Color.

In one embodiment, the step of specifying mapping conditions 610 specifies a missing value color to indicate that a value is missing for a property. In one embodiment, the step of specifying mapping 610 indicates a missing value for a property on a map by displaying the entire line segment for the property in the missing value color. In one embodiment, a missing value is a non-response by a human respondent to a survey question.

In one embodiment, displaying lines for individuals 630 uses a line reversal color to replace a background color of a line segment and a line background color to replace the presence color of the line segment. As an example, displaying lines for individuals 630 displays a date of birth in the presence color. Displaying lines for individuals 630 displays the age for the same example in the line reversal color.

In some embodiments, displaying lines for individuals 630 assigns the presence color to be a categorical color specific to a categorical property such as a country of origin.

In some embodiments, specifying mapping conditions 610 specifies a pair of alternation colors both able to serve as a presence color. In one embodiment, displaying lines for individuals 630 displays a line segment for a specified property for the first individual in a linear sequence of individuals using one of the alternation colors as the presence color. Displaying lines for individuals 630 displays the property for the second individual in the sequence using the same alternation color as the presence color if the values for the first and second individuals are the same. If the values are different, displaying lines for individuals 630 uses the other alternation color as the presence color. Displaying lines for individuals 630 proceeds iteratively through the sequence of individuals, alternating between the two alternation colors whenever there is a change in the value for the property for the next individual displayed. One result is an alternation in the presence color with a change occurring wherever there is as change in the value of a property from one individual to the next.

(B). Alternative property labels. In one embodiment, labeling property zones 625 provides alternate information in a property label. In one embodiment, the label includes a count of all individuals with non-missing values. In one embodiment, labeling property zones 625 places a distance indicator line at the boundary between two property zones with the line length indicating the similarity in the total comparison distance between the properties of the two property zones. In some alternate embodiments, different portions of a line segment have different colors, different widths, different styles, or any combination of color, width, and style. In one such embodiment, the color of a portion of a line segment is used to represent the conditional probability of finding a neighboring property. In one embodiment, a line segment is displayed at an angle to the direction of the line of the individual.

(C) Embodiments of this invention are useful for tasks for which it is useful to arrange properties in a linear sequence based on similarities among individuals. In one embodiment, the methods of the invention discussed herein can be used in the placement of objects like grocery items in stores and warehouses so that people can travel efficiently in a linear path from one object to the next in a task like shopping for food. In the embodiment, a shopping list can be treated as an individual with the objects on the shopping list being the properties. The methods of the invention discussed herein can be used to create linear sequences of objects such that the objects common to shopping lists can be placed close together geographically.

In another embodiment, an ordered linear sequence is made of properties of commercial products like clothing purchased by customers. The sequence can be used for the design of new products including services such as those in the medical domain. Product design is a subset of the larger issue of resource allocation since the construction of one type of product usually means that another is not made. More generally, embodiments of the invention discussed herein can be used to allocate any type of resource.

(D) Embodiments of this invention can be incorporated into software such as statistical packages, word processing software, or data mining software.

(E) Construction of additional linear sequences. Some embodiments include creating linear sequences of properties. The use of a single linear dimension might result in the loss of information about the population. In one embodiment, additional information is extracted by constructing a sequence which is a permutation orthogonal to the original dimension. Additional information about the population may be extracted using an orthogonal dimension.

(F) Automated data entry. Previously described embodiments make brief mention of some embodiments of entering individuals 310 for entering the population. In an alternate embodiment, an individual including text is entered automatically including a method for the automatic specification of ideas in text.

(G) Alternate displays. In the embodiments discussed hereinbefore, property zones have the form of rectangles. In an alternate embodiment, the rectangles can be bent to have the form of bands which follow a nonlinear shape such as a circle or a snake.

In some alternate embodiments, different portions of a line segment can have different colors, different widths, different styles, or any combination of color, width, and style. In one such embodiment, the color of a portion of a line segment is used to represent the conditional probability of finding a neighboring property. In one embodiment, a line segment is displayed at an angle to the line of the individual.

In one embodiment, a line segment is divided into more than two line sub-segments with each sub-segment in a different color to indicate a specific value.

(H) Writing of documents. In one embodiment, a user or group of users can write fragments of documents such as paragraphs. A user can then identify key ideas in the document fragments. Then a linear ordering by property in an embodiment of the invention discussed herein can show the ideas which are associated with each other. This information can guide users in organizing the structure of a document.

(I) Time displays. In the one embodiment, a time is converted to a number and is used as any other property. In an alternate embodiment, maps of the invention discussed herein are shown sequentially over time as is done for a motion picture.

(J) Alternate cursor. In one embodiment, a cursor includes the indication of an individual. In an alternate embodiment, a cursor includes an indication of a property.

(K) Highlighting lines and properties. In some embodiments, individuals in a selected individual region can be highlighted by replacing the map background color in the region by a highlight color for individuals. In some embodiments, a user selected property can be highlighted by replacing the map background color in the property zone of the property by a highlight color for properties. In some embodiments, the joint highlight of individuals and properties can be accomplished by replacing the map background color by a joint highlight color in the regions of the map where a selected individual region intersects a property highlight region.

CONCLUSION

Systems, methods, and structures have been discussed to enhance population analysis by displaying individuals as parallel lines with lengths of line sub-segments indicating numerical values of properties. Whereas prior methods using text tables do not display the information in a compact form, the embodiments discussed hereinbefore do permit compact and clear displays thereby providing a superior method of examining relationships between individuals and their properties.

Although the specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention discussed herein. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalences to which such claims are entitled.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method of analyzing a population of individuals comprising:
   entering the population of individuals into an information processing system wherein each individual includes one or more properties wherein each property includes one or more conditions and a numerical value; and
   displaying the population of the individuals in a visual map using a computer for displaying, wherein the map is divided into parallel property zones of properties and wherein the individuals are represented in the map as parallel lines wherein the lines are orthogonal to the property zones.

2. The method of analyzing a population of individuals of claim 1, wherein the display of each parallel line includes a line segment corresponding to a property zone wherein a line segment includes a line sub-segment displayed in a presence color representing a numerical value of the property.

3. The method of analyzing a population of individuals of claim 1, further comprising using a line background color to display one or more portions of the line.

4. The method of claim 1, further comprising assigning the properties in the map in an ordered sequence.

5. The method of claim 4, wherein a user specifies the ordered sequence.

6. The method of claim 1, further comprising constructing a specification line of text to associate at least one keyword with an idea.

7. The method of claim 1 wherein an individual is a document including text.

8. The method of claim 1 wherein an individual is a patent, trademark, or court case.

9. A method of analyzing a population of individuals, comprising:
   collecting data on individuals in a population wherein each individual possesses one or more properties wherein each property includes one or more of conditions of a value and a name;
   specifying properties that each individual must have;
   specifying an ordered linear sequence for the properties;
   specifying an ordered linear sequence for the individuals; and
   displaying the individuals in a visual map using a computer for displaying, wherein the map is divided into parallel property zones representing properties and wherein the individuals are represented in the map as parallel lines wherein the lines are orthogonal to the property zones.

10. The method of claim 7, further comprising a line segment representing an individual.

11. The method of claim 7 wherein the line segment corresponds to a property zone and includes a line sub-segment displayed in a presence color representing a numerical value of the property.

12. The method of claim 7 wherein the line segment corresponds to a property zone and includes a line sub-segment displayed in a missing color.

13. The method of claim 7 further comprising a use of a line background color to display a portion of the line not displayed in the presence color.

14. The method of claim 7 further comprising a use of a curser color to display a portion of the line not displayed in the presence color.

15. The method of claim 7 further comprising a use of an output color to display a portion of the line not displayed in the presence color.

16. The method of claim 7 wherein the map includes the display of hint information providing information about the individual.

17. The method of claim 7 wherein spacing between the lines is non-uniform and adjusted dynamically by the user.

18. The method of claim 7, further comprising selecting a line on the map to display results of detailed information about the individual represented by the line.

19. The method of claim 7, further comprising constructing a specification line of text to associate at least one keyword with an idea.

20. A machine readable medium, with instructions thereon, the instructions, when executed, operable to:

collect data on individuals in a population wherein each individual possesses one or more properties wherein each property includes one or more of conditions of a value and a name; and generate a map display on a computer, the map display being divided into parallel property zones representing properties; and parallel lines wherein the parallel lines are orthogonal to the property zones and wherein individuals are represented in the map as the parallel lines.

21. The machine readable medium of claim 20 wherein each of the parallel lines of the map display includes a line segment corresponding to a property zone wherein a line segment includes a line sub-segment displayed in a presence color representing a numerical value of the property.

22. A system for analyzing a population of individuals, comprising:

a processor capable of collecting data on individuals in a population wherein each individual possesses one or more properties wherein each property includes one or more of conditions of a value and a name; and a monitor capable of electronically displaying a map, the map display being divided into parallel property zones representing properties and parallel lines wherein the parallel lines are orthogonal to the property zones and wherein individuals are represented in the map as the parallel lines; and a machine readable medium, with instructions thereon, the instructions, when executed, operable to generate the map display on the monitor.

23. The system of claim 22 wherein each of the parallel lines of the map display includes a line segment corresponding to a property zone wherein a line segment includes a line sub-segment displayed in a presence color representing a numerical value of the property.

24. A method for ordering a population of individuals comprising:

entering the population of individuals into an information processing system wherein each individual includes one or more properties wherein each property includes one or more conditions and a numerical value;

ordering the individuals and properties; and displaying the population of the individuals in a visual map using a computer for displaying, wherein the map is divided into parallel property zones of properties and wherein the individuals are represented in the map as parallel lines wherein the lines are orthogonal to the property zones.

25. The method of claim 24 wherein the ordering is unidimensional for both properties and individuals.

26. The method of claim 24 wherein the ordering is a hierarchical sort.

27. The method of claim 24 wherein the ordering is performed by solving the Traveling Salesman Problem.

\* \* \* \* \*